March 7, 1939.  N. A. CHRISTENSEN  2,150,021
VEHICLE BRAKE
Filed April 9, 1932  7 Sheets-Sheet 3

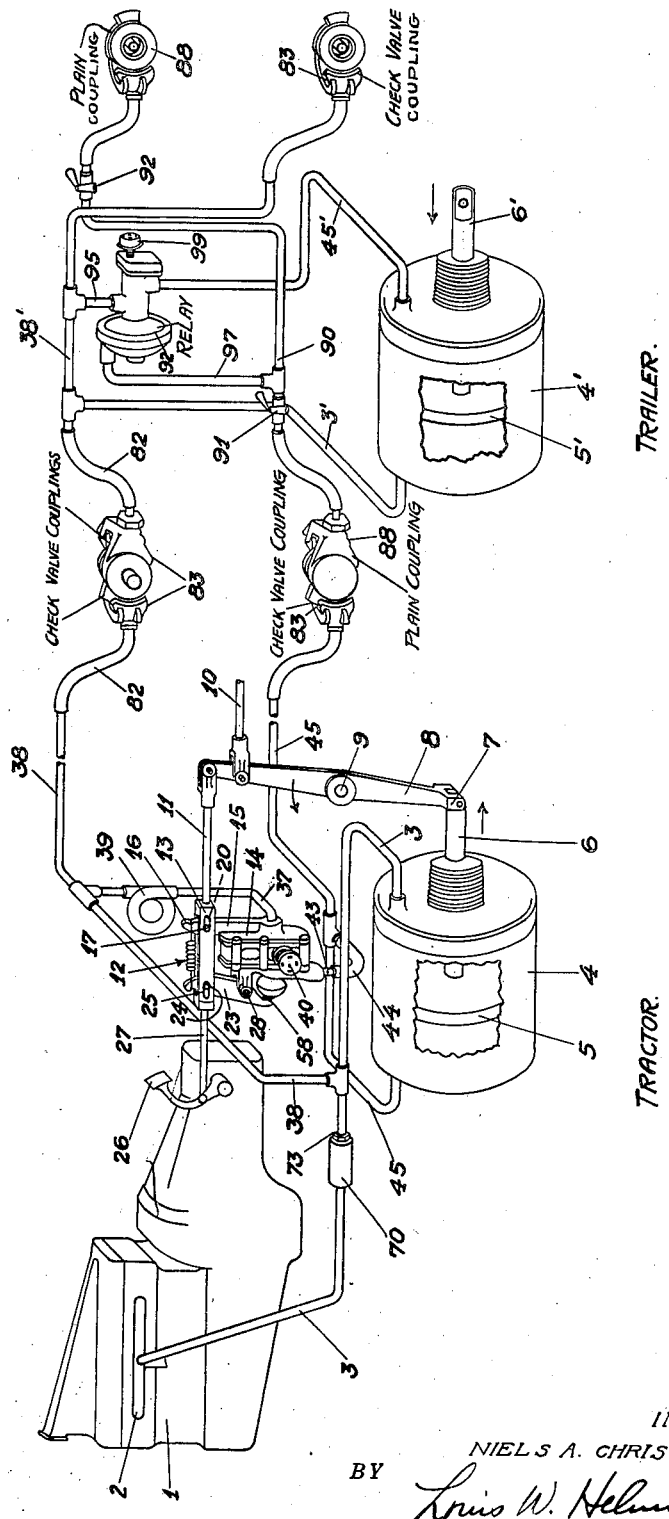

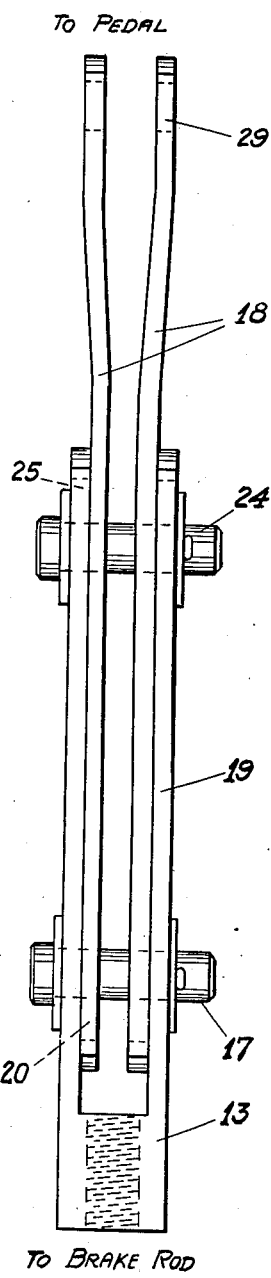
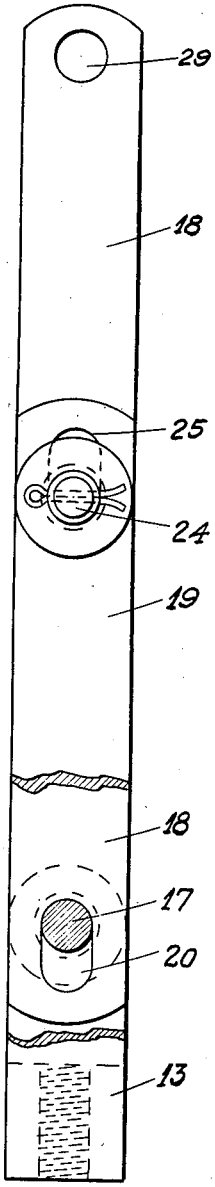
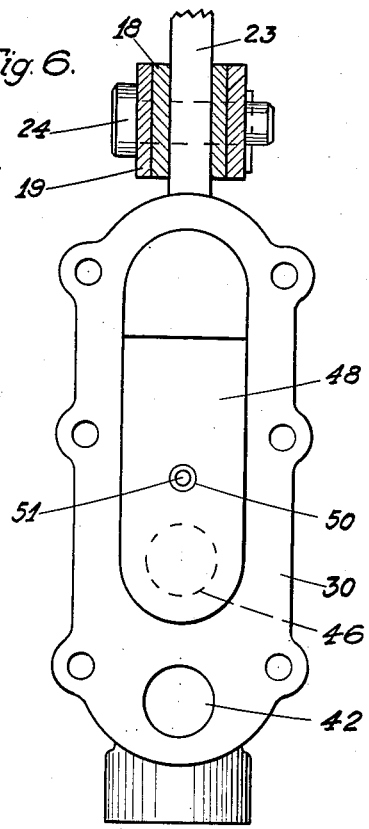
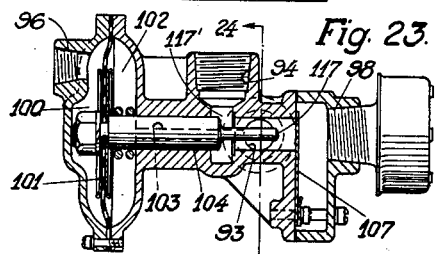
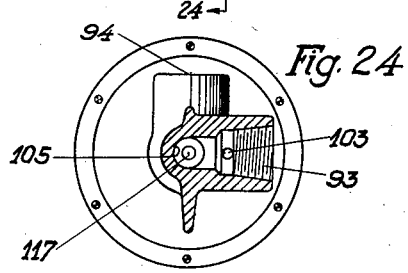

INVENTOR
NIELS A. CHRISTENSEN
BY
Louis W. Helmuth
ATTORNEY

March 7, 1939.  N. A. CHRISTENSEN  2,150,021
VEHICLE BRAKE
Filed April 9, 1932  7 Sheets-Sheet 4
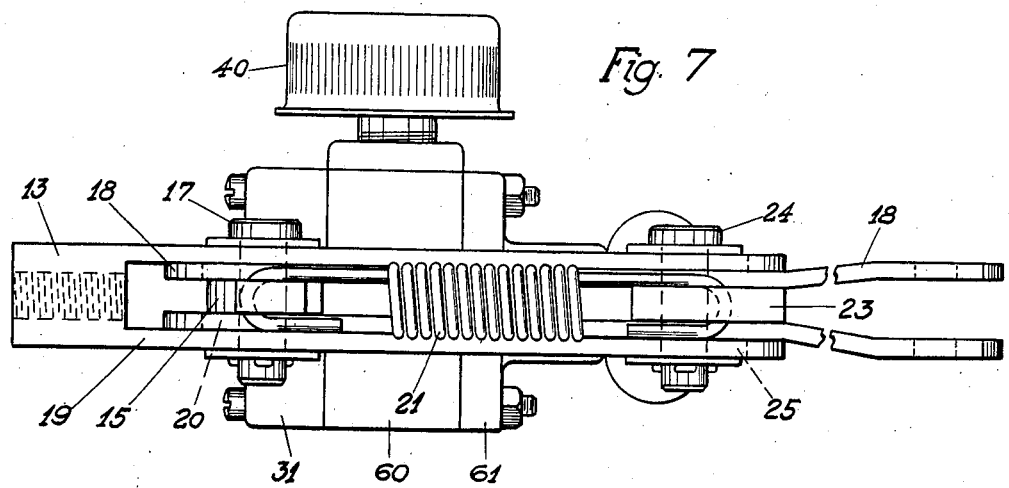
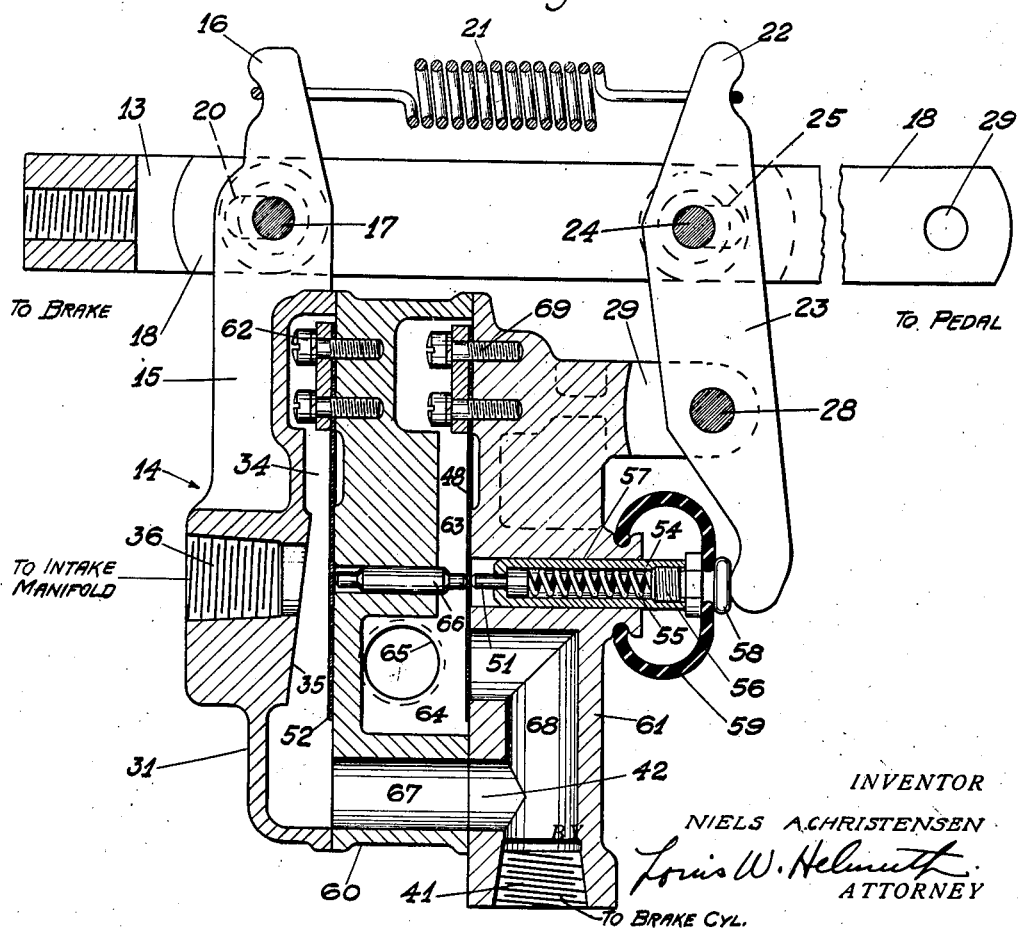
INVENTOR
NIELS A. CHRISTENSEN
Louis W. Helmuth
ATTORNEY March 7, 1939. N. A. CHRISTENSEN 2,150,021
VEHICLE BRAKE
Filed April 9, 1932 7 Sheets-Sheet 5
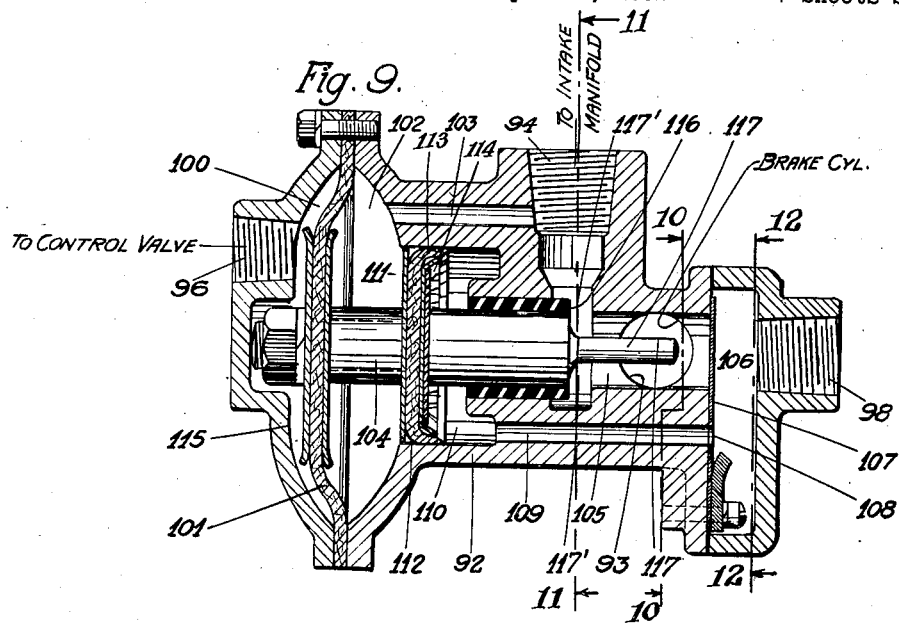
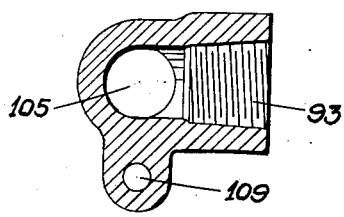
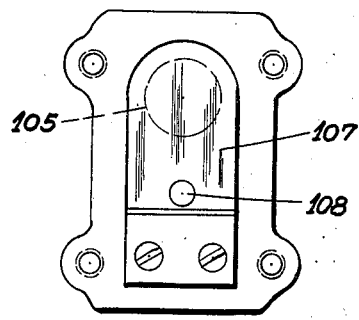
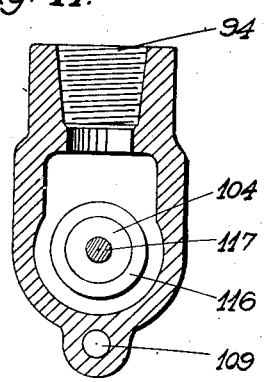
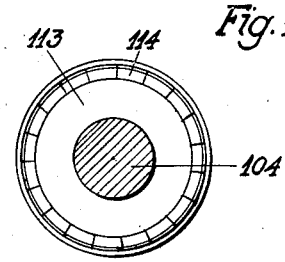
INVENTOR
NIELS A. CHRISTENSEN
BY
ATTORNEY March 7, 1939.  N. A. CHRISTENSEN  2,150,021
VEHICLE BRAKE
Filed April 9, 1932  7 Sheets-Sheet 7

INVENTOR
NIELS A. CHRISTENSEN
BY *Louis W. Helmuth*
ATTORNEY

Patented Mar. 7, 1939

2,150,021

UNITED STATES PATENT OFFICE 2,150,021

VEHICLE BRAKE

Niels A. Christensen, South Euclid, Ohio

Application April 9, 1932, Serial No. 604,203

19 Claims. (Cl. 188—152)

This invention relates to new and useful improvements in vehicle brakes and more particularly to mechanism for controlling the brakes of automotive vehicles either manually or by means of a vacuum effect derived from the power plant of the vehicle.

An important object of the invention is to provide brake operating mechanism employing the general arrangement and combination of elements disclosed in my prior United States Patent No. 1,291,765 dated January 21, 1919.

Another important object of the invention is to provide a novel form of control valve mechanism carrying forward the idea disclosed in my former patent and connected in a novel manner to the foot pedal and brake rigging to obtain refined control of the brakes of the vehicle without subjecting the valve parts to stresses when the brakes are applied by manual power alone.

A further object of the invention is to provide an improved form of relay valve for obviating any lag in the application of brakes on a trailer or trailers and in which no springs are required for returning parts of the relay valve to normal positions upon release of the brake mechanism under the control of the main control valve mounted on the tractor.

A still further object of the invention is to improve and simplify the valve construction of my former Patents Nos. 1,787,613 and 1,787,614, granted January 6, 1931, and to improve the system in other respects as will become more apparent during the following detailed description, whereby the present improvements may be used in conjunction with either vacuum or air suspended brake systems.

Other objects and advantages of the invention will become apparent during the course of the following description.

In the accompanying drawings forming a part of the description and wherein like numerals are employed to designate like parts throughout the several views, Fig. 1 is more or less a diagrammatic view of my present improvements shown applied to a tractor and trailer for simultaneous control of the brake mechanisms on both vehicles under control of a single valve mechanism on the tractor.

Fig. 2 is a top plan of the improved form of lost motion connection between the foot pedal and the brake rigging.

Fig. 3 is a side elevation of the same, parts thereof being broken away.

Fig. 6 is a transverse section of Fig. 5 at the point where the two sections of the casing are joined.

Fig. 7 is a top plan of the lost motion connection and another form of control valve.

Fig. 8 is a vertical longitudinal section of the same.

Fig. 9 is a vertical longitudinal section of the relay valve.

Fig. 10 is a transverse section of the same taken on the line 10—10 of Fig. 9.

Fig. 11 is a transverse section taken on the line 11—11 of Fig. 9.

Fig. 12 is a transverse section taken on the line 12—12 of Fig. 9.

Fig. 13 is an end elevation of the relay piston.

Fig. 23 is a longitudinal section through a modified form of relay valve, and

Fig. 24 is a transverse section of the same taken on line 24—24 of Fig. 23.

Figure 4:
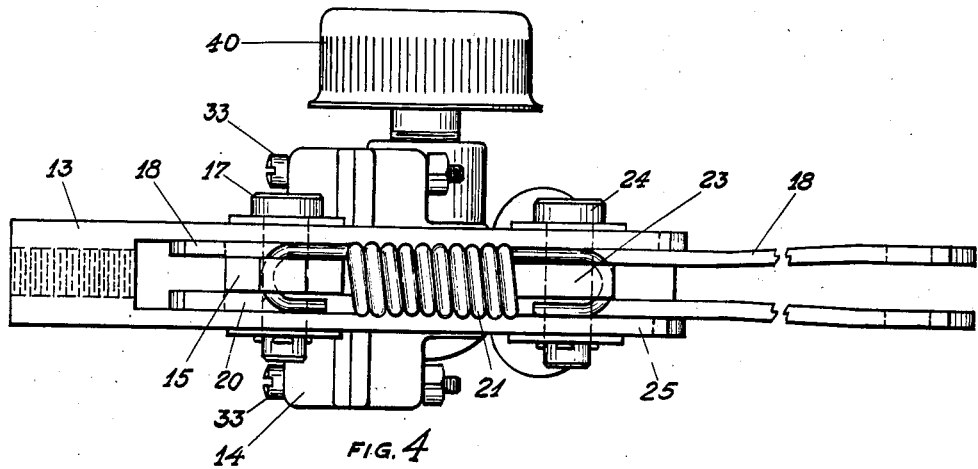
Fig. 4 is a top plan of a control valve illustrating its connection with the lost motion connection.

Referring to the drawings in detail, wherein for the purposes of illustration, the invention is shown in a vacuum suspended system, the numeral 1 indicates an internal combustion engine having a throttle controlled intake manifold 2 from which suction or a partial vacuum is derived for the operation of the system. A pipe 3 is connected directly to the intake manifold and to the rear end of a rigidly mounted brake or power cylinder 4, such as disclosed in my co-pending application, Serial No. 572,427 filed October 31, 1931. Both ends of this cylinder in the present illustration, are closed so that a partial vacuum may be created in both ends of the cylinder on opposite sides of the piston 5 therein whereby this piston may be normally submerged in a partial vacuum and is disposed between the ends of the cylinder when the brakes are in release position.

The piston 5 has its rod 6 extending through the rear end of the cylinder 4 and is connected to the lower forked end 7 of a lever 8 fulcrumed as at 9 on the motor vehicle. At the point adjacent its upper end, the lever 8 has pivotally connected thereto a forked rod 10 which connects to the brake rigging of any desired type of brake mechanism and as there are many types well known to those skilled in the art, they have not been illustrated.

The upper end of the lever 8 is pivotally connected with a brake rod 11 to which is connected a lost motion connection 12, consisting of an elongated yoke 13 between the arms of which, adjacent its closed end, is pivotally suspended a casing 14 of a control valve by means of an integral vertical arm 15 of the casing which terminates in a hooked portion 16 for a purpose to be later described. A pin 17 extends through the arms of the clevis 13 and the arm 15 to suspend the valve casing from the lost motion connection.

The other section of the lost motion connection consists of a pair of links 18, which are arranged in spaced parallel relationship as clearly shown in Fig. 2 to slide along the inner surfaces of the arms 19 of the clevis 13. Each link 18 adjacent one end is provided with an elongated slot 20 to slidably receive the pin 17 and permit movement of the links 18 relative to the yoke 13 for a predetermined distance without moving the latter. This, as will be more fully explained hereinafter, permits actuation of the valve prior to manual operation of the brakes as well as to permit a follow-up movement of the valve casing after brake application. As will be seen in Figs. 4, 5, 7, and 8, the arm 15 is disposed between two links 18 and extends above these links for connection with one end of a tension coil spring or reaction part 21, the other end of the spring being hooked about the upper end 22 of a valve operating lever 23 which is pivotally connected by a pin 24 to the links 18 between their ends, for normally urging the valve actuating lever 23 to a release position indicated in Figs. 5 and 8. This pin 24 extends through slots 25 provided in the ends of the arms 19 of yoke 13 and the spring 21 normally bottoms the pin 24 in the ends of the slots 25 adjacent the pin 17 so that, when the foot pedal 26 which is connected to the links 19 by means of the rod 27, is depressed, the pin 24 will cause the valve actuating lever 23 to fulcrum on pin 28 which is carried in an integral forked extension 29 of the valve casing 14, without exerting any pull on the brake rod 11, due to the idle movement of the pin 24 in the slots 25 in the forward end of the yoke 13. The apertures 29 in the forward ends of the links 18 are for connection to the section 27 of the brake rod which extends to the brake pedal 26.

Figure 5:
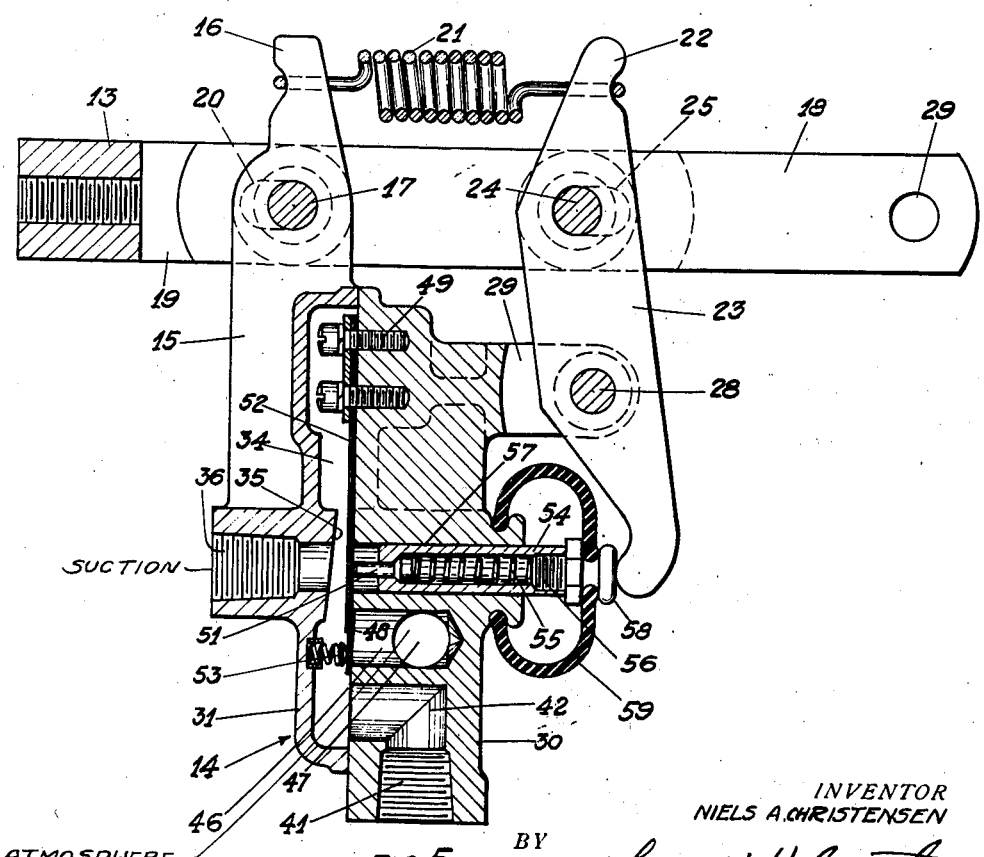
Fig. 5 is a vertical longitudinal section through the same.

Referring to the single type valve shown in Figs. 4, 5 and 6, its casing is made in two sections 30 and 31, suitably fastened together by means of bolts 33, with a gasket therebetween. The section 31 carries the integral extension 15 and is of shell-like conformation to define between it and the section 30, a chamber 34. The inner surface of section 31 is provided with a smooth valve seat 35 inclined as shown to conform to a position of a leaf spring valve to be presently described whereby a tight seating of the valve is effected. Opening through this valve seat is a port 36 which may be either a high or low pressure port depending upon whether the valve is used in an air suspended or a vacuum suspended system. In the present illustration of this valve, the port 36 is connected to a suction pipe 37 having communication with a suction pipe 38 which is coupled to the pipe 3 to be normally in communication with the intake manifold. The pipe 37 has included therein a section of flexible or rubber tubing 39 to permit the follow-up action of the valve mechanism. When this valve is employed in an air suspended system, the port 36 normally communicates with the atmosphere through an air filter 40 applied to the port 36.

The other section 30 of the valve casing is provided in its lower end with a brake cylinder port 41, normally in communication by means of passage 42 with the chamber 34. This port is connected by a pipe 43 having a flexible section 44 therein with a pipe 45 which communicates with the forward end of the brake cylinder 4. The port 36 being normally open to the intake manifold, it will be seen that a partial vacuum is created upon opposite faces of the piston 5 when the control valve is in brake release position.

Above the passage 42 is a second passage 46 opening into the face of the section 30 which defines a wall of the chamber 34. The other end of this passage communicates with a port 47 in which is secured the air filter 40 when the valve is used in a vacuum suspended layout. However, in the use of the valve for an air suspended system, this port 47 is placed in communication with a source of lower than atmospheric pressure such as the intake manifold through the pipe 38 and the air filter 40 is applied to port 36.

Normally cutting off communication between passage 46 and the cylinder port 41, is a light, flat leaf spring 48 secured at one end by cap screws 49 to the nicely machined surface of the casing section 30. As more clearly shown in Fig. 6, the valve 48 is provided with an aperture 50 for the free passage of a valve actuating pin 51. Superimposed upon the valve 48 is a second light, leaf spring valve plate 52 also secured to the casing section 30 by the cap screws 49 and adapted to close the port 36 when the valve actuating pin 51 is projected as will be presently described. This second valve 52 is imperforate as is obvious for the abutment of the valve actuating pin 51. Both of these leaf spring valve plates are constructed of or coated with non-oxidizing and non-corrosive material so that their perfect seating capabilities are not impaired. It has been found that spring steel strips electro cadmium plated may be used advantageously. When this type of valve is employed in a vacuum suspended system, a spring device 53 may be employed for normally preventing the valve 52 from being sucked on to its seat 35.

The valve operating pin 51 is provided with an enlarged head slidably fitted in the bore of a quill 54, with a coil spring 55 abutting the head of the pin and a screw cap 56 threaded in the free end of the quill for normally retaining the valve actuating pin in a projected position. This quill is slidably fitted in a bore 57 provided in the casing section 30 in alignment with the port 36 and is projected by the camming action of the lower end of the valve operating lever 23 against the abutment head 58 provided on the screw 56. A boot 59 of flexible material is secured to the reduced portion of the screw 56 and at its opposite end in a groove surrounding a boss on the casing section 30. The tension of the coil spring 55 is sufficient when under compressive forces to overcome the tension of the outer leaf spring 52 so that this valve will be moved to its seat 35 when the quill 54 is projected. However, the tension of spring 55 is just slightly in excess of that of the leaf spring 52 so that the latter will not be damaged by its pressure against the seat when the quill is further projected to abut the leaf spring valve 48 to open the same after closing of the valve 52 to admit the higher pressure to the brake cylinder.

Figure 15:
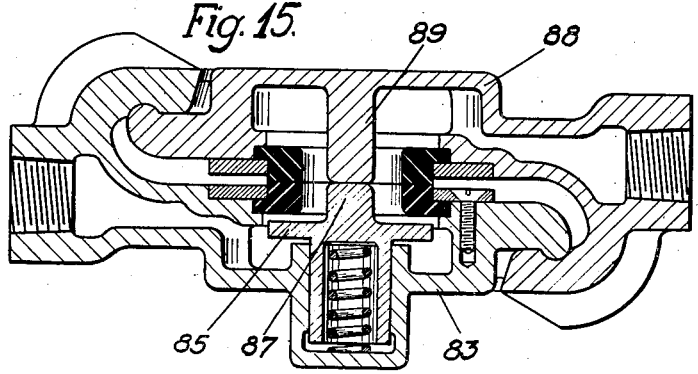
Fig. 15 is a similar view of another type of coupling used in conjunction with the form shown in Fig. 14.
Figure 16:
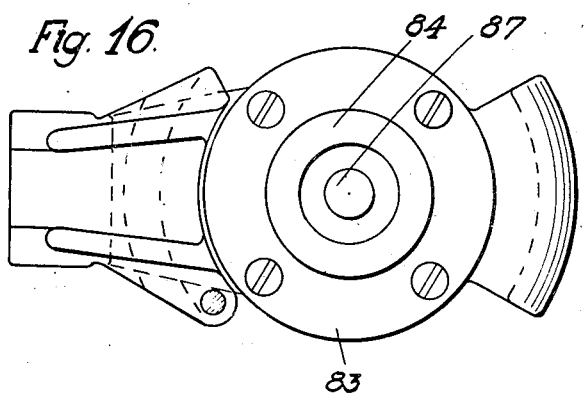
Fig. 16 is a top plan of the lower section 83 of the automatic coupling shown in Figs. 14 and 15.
Figure 17:
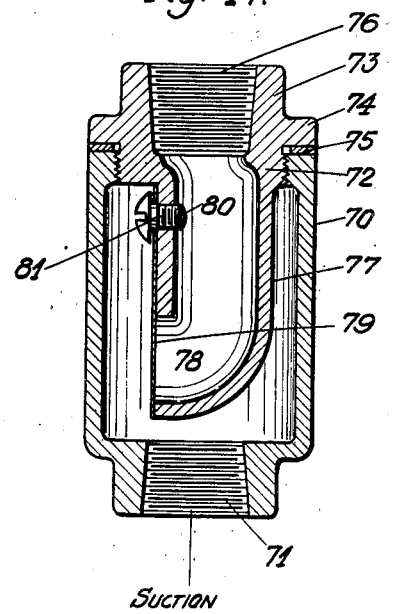
Fig. 17 is a longitudinal section of a check valve used in the pipe line to the intake manifold.
Figure 18:
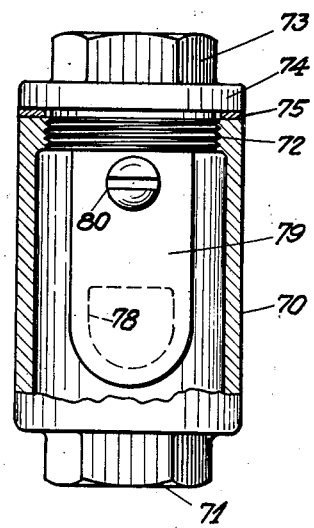
Fig. 18 is an elevation of the same with parts thereof broken away to illustrate the interior construction.
Figure 19:
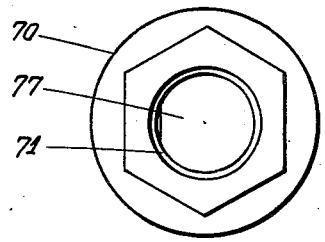
Fig. 19 is an end elevation of the check valve.

In the dual type of valve illustrated in Figs. 7 and 8, the control valve casing is constructed in three separable sections 31, 60 and 61 and each of the latter two sections forms a mounting for one of the leaf spring valves. Parts of this dual type valve corresponding to those of the single type valve illustrated in Fig. 5 are designated with corresponding reference numerals. As in the single type valve, the casing section 31 is shell-like and cooperates with the intermediate section 60 in forming the valve chamber 34. Likewise, a leaf spring valve 52 is secured at one end to the intermediate section 60 by means of a cap screw 62 and is adapted to close against the valve seat 35 as in the preceding form. If desired, a spring similar to 53 in the preceding form may be employed for engagement with the valve 52 for positively retaining the valve open.

One face of the intermediate section 60 is chambered to provide a passage 63 communicating with a pocket or chamber 64, which latter communicates with a port 65 leading to the atmosphere through an air filter 40. Above this pocket 64 and in alignment with the port 36, the intermediate section 60 is bored for slidable air-tight reception therein of a valve operating pin 66, which is adapted to engage the valve 52 and force the same to its seat 35 to cut off the source of the partial vacuum from the chamber 34. This latter chamber communicates through a passage 67 beneath the pocket 64 with a passage 42 provided in the section 61 of the casing. As in the preceding modification, this passage 42 communicates with the port 41 leading to the brake cylinder by means of pipe 45. Communicating with the passage 42 is a passage 68 which opens out into the face of section 61 into the chamber 64 so that atmospheric pressure can enter the passage 68 when the valve 48 is open. This valve is of the same construction as the valve 48 in Fig. 5 and is secured to the section 61 by means of cap screws 69. Obviously, the three sections of this housing may be secured together with suitable gaskets interposed and the valve seats and valves should of course be of non-corrosive and non-oxidizing material or coated with such material.
A check valve 70 is installed in the pipe line 3 to the intake manifold between the latter and the pipe 38 and comprises a casing 70 having a port 71 in one end for connection with the pipe line 3. The opposite end of this casing is preferably provided with an internally threaded opening for engagement with a threaded portion 72 of a cap like member 73 having an annular flange or shoulder 74 for engagement with a gasket 75 pressed against the end of the casing 70 to establish an air tight seal. This cap like member 73 is provided with a threaded port 76 for connection in the pipe line 3. Extending from the cap 73 into the cylindrical casing 70 is a hollow extension communicating with the port 76 at one end and opening at right angles to the axis of the casing 70 in a port 78 in the flat face of the extension 77. This port 78 is covered by a very thin leaf spring valve 79 which is perhaps .007 of an inch in thickness. The valve 78 is mounted in position to normally cover the port 78 by means of a screw 80 having an enlarged portion 81 of the shank extending through an opening in the leaf spring valve 79 with about .005 of an inch clearance. The head of this screw is also spaced from the valve 79 by reason of the enlarged portion 81 seating against the tubular extension 77 so that one end of the valve may be said to be loosely connected with the tubular extension 77. This check valve serves several purposes among which may be noted its office of maintaining a comparatively high degree of partial vacuum in the system and in any event, never less than the degree of partial vacuum existing on the intake side of the valve, regardless of the degree of or lack of vacuum created in the intake manifold, since the valve 79 will automatically seat and close the port 78 whenever the pressure in the casing 70 exceeds that existing in the tubular extension 77. In other words, this condition may be caused by stalling of the internal combustion engine or whenever the degree of suction or vacuum created thereby is less than that formerly established or already existent in the system or on the other side of the check valve. When the degree of suction cerated by the engine is greater than that existing in the system, it will be obvious that the leaf spring valve 79 will automatically open so that the same degree of suction or vacuum in the system which is then being created by the engine will exist at both sides of the check valve.

Figure 22:
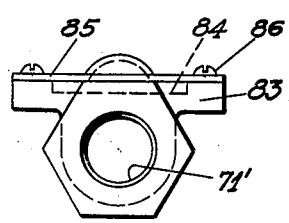
Fig. 22 is an end elevation of the same.
Figure 21:
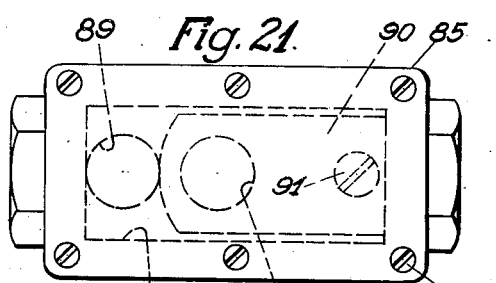
Fig. 21 is the top plan of this form of valve.
Figure 20:
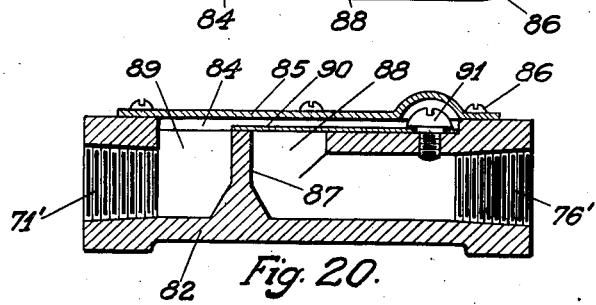
Fig. 20 is a longitudinal section of a modified form of check valve.

Figs. 20 to 22 inclusive illustrate modified form of check valve, the casing 82 of which is a die casting having an enlarged flat plane portion 83 provided with an elongated rectangular recess 84, covered by a cover palte 85 secured upon a gasket and to the casing 82 by means of the screws 86. The casing 82 is provided with a longitudinal bore interrupted between its ends by means of a partition 87 extending to the plane of the bottom of the recess 84 as best seen in Fig. 20. One end 71' of this longitudinal bore is threaded for connection to the pipe leading to the intake manifold, while the opposite end 76' is similarly threaded for a pipe leading to the control valve and one end of the brake cylinder. An opening 88 is bored through the bottom of the recess 84 into the passage leading to port 76', while a corresponding opening 89 is provided in the bottom of the recess to communicate with the port 71'. Communication between the openings 88 and 89 is controlled by a flat leaf spring 90, similar to the spring valve 79 of the preceding modification. This leaf spring valve is held in place by a set screw 91, the same as the set screw 81 of the preceding modification, and it will be noted that the valves in both instances are prevented from turning on these screws as axes by reason of the abutment of one edge against the square shoulder adjacent the screw. The operation of this form of check valve is the same as for the preceding figures so that its operation will not be repeated.

The apparatus thus far described constitutes a complete system for a single vehicle and its mode of operation is as follows: Assuming that the internal combustion engine is operating and creating a partial vacuum in the pipe line 3 and the valve disclosed in Figs. 5 and 8, whichever type is employed, is in the position illustrated, it will be obvious that a partial vacuum is created on the right hand side of the piston 5 of the brake cylinder and a corresponding vacuum is created on the left hand side thereof through the pipe 38, port 36 of the control valve casing, port 41, thereof and hence by way of pipes 43 and 45 into the left hand end of the brake cylinder 4. The piston will then be in its released position, submerged in a partial vacuum with the brake retracting springs holding the brakes in release position. When it is desired to apply the brakes, pressure is exerted on the brake pedal 26 causing the links 18 of the lost motion connection to move relative to the yoke 13, thereby moving the pin 24 longitudinally of the slots 25 which causes the valve operating lever 23 to swing on its fulcrum 28 against the tension of the spring 21 and move the quill and valve operating pin 51 so that the latter first moves the valve 52 to a position engaging its seat 35 whereby suction is cut off to the brake cylinder port 41 and consequently to the left hand side of the piston 5. The valves are then in lap position and slight further movement of the foot pedal causes further pivoting of the valve operating lever 23 and consequently the quill 54 then moves into engagement with the valve 48 to push it off of its seat and uncover the passage 46 leading from the atmospheric port 47 so that atmospheric pressure is created in the brake cylinder port 41 and also in cylinder 4 at the left hand end thereof to cause the piston 5 to move toward the right of the figure as illustrated by the arrow. Operation of the piston 5 causes the lever 8 to fulcrum at 9 and pull on the brake rigging 10 to apply the brakes, while at the same time by reason of this action, the brake rod 11 connected with yoke 13 moves in the direction of the pedal so that the valve casing will follow the brake pedal thereby restoring the lost motion connection to its original position by reason of the action of spring 21. This relative movement between the valves and valve casing restores the valves to their normal release positions unless the foot pedal is depressed further for a complete application at which time the piston 5 will have reached the end of its travel with the result that the control valve no longer follows the movement of the foot pedal and accordingly the valves can be held in full application position or lap position to retain the brakes applied as long as desired. Upon release of pressure on the foot pedal the two valves will be restored to their normal release positions thereby again establishing communication between the pipe 38 and the brake cylinder port 41 so that air dumped into the left hand end of cylinder 4 will be gradually drawn back through the valve mechanism, pipes 37 and 38 past check valve 70 and back into the intake manifold. This will reestablish a partial vacuum on opposite faces of the piston 5 allowing a return of the brake rigging and control valve mechanism to a normal release position. By reason of the lost motion connection in the brake rod 11, and the latter's connection with the brake rigging 10, it will be obvious that the brakes may also be applied by manual power after the section 18 of the lost motion connection has moved its slots 20 to bottom against the pin 17 to thereby exert a direct pull manually upon the rod 11 and thence back to the brake rigging.

Due to the lost motion connection being located externally of the valves and the valve lever being limited in its application movement by the pin 24 bottoming in the ends of the slots 25, no abnormal stresses are imposed upon the leaf spring valves or valve parts.

Figure 14:
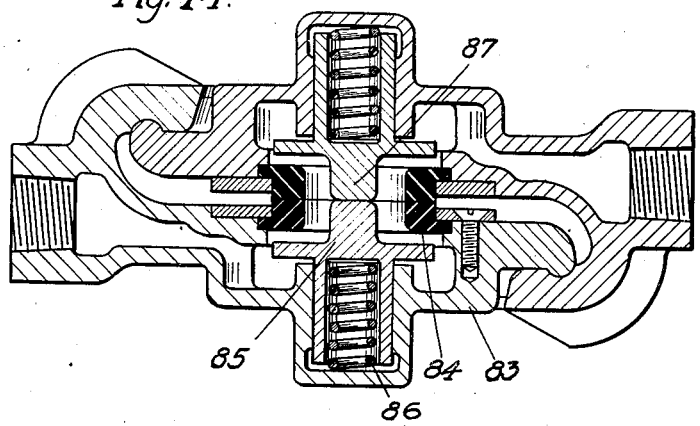
Fig. 14 is a longitudinal vertical section of an automatic coupling used between truck and trailer.

In Fig. 1, the apparatus has been illustrated hooked up with apparatus for power application of the brakes on a trailer. In this installation a brake cylinder 4' closed at both ends is provided with a vacuum suspended piston 5' having a piston rod 6' adapted for connection with the brake rigging on the trailer. The forward end of this brake cylinder is connected by a pipe 3' to a pipe 38' which is connected by flexible hoses 82 and check valve coupling 83, similar to my prior United States Patent Nos. 1,601,907, 1,614,-652 and 1,614,653, to the pipe line 38 of the tractor. These check valve couplings 83 are illustrated in Fig. 14 and are generally of the well recognized type of quick detachable couplings, each of which has a thick rubber gasket 84 clamped over its port and extending there beyond to be firmly clamped against a corresponding gasket on the complementary coupling by connection of the two couplings. As is usual, each coupling is provided with a complementary tongues and sockets adapted to be mechanically interlocked by turning the tongue of one into the socket of the other in the usual manner. Each of these couplings is provided with an automatically closing check valve 85 normally urged to closed position against the gasket 84 by a tension coil spring 86 seated in a cavity in the valve nesting within a socket as illustrated. The check valve of each coupling is provided with a knob 87 for contact with one another to open the check valves of both couplings when the couplings are united. Upon separation of the couplings, either intentional or accidentally, the check valves 85 automatically close the passage through the coupling.

In Fig. 15 a duplex or combination coupling is illustrated which includes a check valve coupling 83 of the description above enumerated and a plain coupling 88 which is practically the same as the coupling 83 except that it possesses no check valve. However, in order to open the check valve 85 when the plain coupling is coupled to a check valve coupling, the plain coupling is provided with an elongated projection 89 which is adapted to engage the knob 87 of the check valve and open the same when the two coupling members are coupled. However, upon separation of this duplex or combination coupling, one of the couplings automatically closes while the other remains open to admit atmospheric pressure.

Such a combination coupling is illustrated for connecting the pipe 45 of the tractor with the pipe 90 on the trailer installation. This pipe 90 is provided with a cut-off valve 91 which may be closed in case it is desired to dispense with power operation of the trailer brakes without interfering with the application of power brakes on the tractor, and a similar cut-off valve 92 as provided at the other end of this pipe 90 which runs to the rear end of the trailer for connection with a plain coupling 88 in the event it is desired to draw more than one trailer with the tractor. For this purpose of coupling another trailer to the first trailer, the pipe 38 is extended and terminates in a check valve coupling 83. Since each end of the trailer is provided with a check valve coupling and a plain coupling, either end thereof may be connected with the tractor, or additional trailers similarly equipped may be readily attached to the rear end of the trailer connected with the tractor.

To effect simultaneous application of tractor and trailer brakes and prevent any lag in the application of the trailer brakes, after control valve on the tractor is operated, due to the time interval required for the differential pressure to travel the full length of the pipe line, a relay valve 92 is provided with a brake cylinder port 93 connected by pipe 45' to the rear end of the brake cylinder 4'; a low pressure port 94 which is connected by pipe 95 to the suction line 38'; a low and higher pressure port 96 connected to the control valve on the tractor by means of a pipe 97 connecting with a pipe 90 and thence through the coupling to the pipe 45 on the tractor, and a high pressure port 98 to which an air filter 99 is secured. The low and higher pressure port 96 which is connected with the control valve on the tractor communicates with a chamber 100 divided into two separate compartments by a diaphragm 101 secured at its edges between two sections of the relay valve housing. The compartment 102 is always subjected to a partial vacuum by a passage 103 communicating it with the suction port 94. The suction port 94 is also normally in communication by means of passages 117' and 105 with the brake cylinder port 93 and the latter may be placed in communication with a chamber 106 which communicates with the atmospheric port 98. Normally, communication between the brake cylinder port and the chamber 106 is closed by a leaf spring valve 107. This leaf spring valve is provided with an aperture 108 which always establishes communication between the chamber 106 and a longitudinal passage 109 through the relay valve to a piston chamber 110. Within this last mentioned chamber operates a piston 111 secured to the diaphragm rod 104 and consists of a flexible leather disc secured between a pair of metallic plates fastened to the diaphragm rod 104. One of said plates serves to firmly clamp a resilient disc 113 against the leather disc so that the resilient radial tabs 114 around the periphery of the disc press the flanged portion of the leather disc into air tight engagement with the walls of the chamber 110. Opposite faces of this piston are exposed to differential pressures at all times and due to difference of area between the piston and the diaphragm 101, the former is normally held in the position shown in Fig. 9 by the suction existing in diaphragm compartment 115, augmented by the suction against the face of the piston 111 exerted in the chamber or compartment 102.

The diaphragm rod is extended beyond the piston 111 through a lubricating bushing 116 to constitute a valve portion adapted to enter the passage 105 when differential pressures are set up on opposite sides of the diaphragm 101 to cut off communication between the brake cylinder port 93 and the suction port 94. This diaphragm rod is reduced at its end and extended as at 117 so as to impinge the leaf spring valve 107 and open the same when a brake application is made upon the tractor so as to admit the atmospheric pressure to the brake cylinder port 93 from where it is conveyed through pipe 45' into the right hand end of the brake cylinder 4', thereby causing the pressures on opposite sides of the piston 5' to become unbalanced to move the piston rod 6' to the left of Fig. 1. As will be obvious, the unbalancing of the diaphragm 101 is caused whenever the control valve on the tractor is operated by the foot pedal to apply the brakes, which operation causes atmospheric pressure to be admitted to the pipe line 45 and then into pipe 97 leading to the high and low pressure port 96 of the relay valve. With a partial vacuum existing in chamber 102, the diaphragm is caused to move to the right of Fig. 9 thereby projecting diaphragm rod 104 into the passage 105 to cut off communication between the brake cylinder port 93 and the suction port 94 while simultaneously opening the valve 107 to admit atmospheric pressure to pass through the pipe 45' into the right hand end of brake cylinder 4'. This operation causes automatic application of the trailer brakes simultaneously with application of the tractor brakes. Upon re-establishment of a partial vacuum in line 45 and compartment 115 of the diaphragm chamber, the diaphragm 101 will move to the position illustrated in Fig. 9 due to the exertion of atmospheric pressure on the piston 112 thereby moving it to the left and withdrawing the diaphragm rod 104 from passage 105 so as to re-establish communication between the suction port 94 and the brake cylinder port 93. This action of course establishes a partial vacuum upon opposite sides of the piston 5' to equalize pressures and bring the piston to a state of equilibrium. Should the couplings 83 and 88 break apart or should rupture occur in the pipes 45 or 90, the relay valve will be automatically operated in the same manner it is operated whenever brake application is made on the tractor due to atmospheric pressure entering diaphragm compartment 115 and causing over-balancing of the diaphragm to open up communication between the atmosphere and the right hand end of the brake cylinder 4'.

If desired, the relay valve may be constructed as shown in Figs. 23 and 24, so as to eliminate the necessity for the provision of piston 111 to assist in restoring the diaphragm to normal position after a brake application and the pedal has been released. This is accomplished by eliminating the atmospheric pressure port 109 and the aperture 108 in the leaf spring valve 107 and by restricting the diameter of the port of passage 103 and having it lead to the brake cylinder port 93 instead of the suction port 94. Due to this arrangement of the passage 103, an interval of time elapses before equalization of pressures on opposite sides of the diaphragm 101, after the foot pedal has been released to release the brake. In other words, when the control valve has been operated by release of the foot pedal, a greater degree of suction exists in diaphragm compartment 100 than is immediately permitted to be re-established in compartment 102 due to the restriction of passage 103 and the temporary existence of atmospheric pressure in the brake cylinder port 93 so that the diaphragm is restored to normal position to cause its stem 104 to open communication between the suction passage 94 and the brake cylinder port. When the diaphragm is in normal position submerged in a vacuum on both sides, the stem 104 of the diaphragm will be removed from the passage 105 in order to permit normal communication between the suction passage 94 and the brake cylinder port. If desired, a light coil spring may be positioned in compartment 102 to exert sufficient tension upon the diaphragm 101 to assist in restoring it to a state of equilibrium.

It is to be understood that various changes in the size, shape and arrangement of parts may be resorted to without departing from the spirit of the invention or the scope of the appended claims.

I claim—

1. The combination with a control mechanism, a member to be controlled, an operator operated part, a power actuated cylinder having a piston therein operated by pressure differences, said piston being operatively connected to said member, a lost motion connection between said operator operated part and said member including a pair of relatively movable sections, a control valve casing supported by one section, a reciprocable valve in said casing, a valve operating lever of the first order supported by the other section and movably connected to said valve casing and connected directly to said reciprocable valve, and spring means connecting said valve operating lever and the casing for normally retaining said valve lever in release position.

2. The combination with a control mechanism, a member to be controlled, an operator operated part, a power actuator cylinder having a piston therein operated by pressure differences, said piston being operatively connected to said member, a lost motion connection between said operator operated part and said member including a pair of relatively movable sections, a control valve casing carried by one section and connected to said member, a valve in said casing, a reciprocable valve lever of the first order carried by the other section and pivotally connected to said valve casing and connected directly to the valve, and spring means for connecting said valve lever and the casing adapted to be tensioned by relative movement of said sections and adapted for normally retaining said valve lever in release position.

3. The combination with a control mechanism comprising a member to be controlled, and having limits of movement in two directions, an operator operated part, a power actuator having a pressure operated member therein operated by pressure differences, said piston being operatively connected to said member, a lost motion connection between said operator operated part and said member including a pair of relatively movable sections each having a slot, one of said sections being connected with said member and the other section being connected with said operator operated part, a control valve casing including an extension having a pin operating in the slot of the section connected with said operator operated part, a valve lever connected to said section connected with the operator operated part, a pin carried by said section and operating in a slot in the section connected with said member, said valve lever being pivotally connected to the valve casing for operating a valve therein for controlling said pressure differences, spring means connecting said valve lever and the valve casing extension for normally retaining said valve in released position, and said second pin adapted to bottom in said second slot to effect a direct mechanical connection between said operator operated part and said member when said valve has been fully opened.

4. The combination with an automotive vehicle and brake mechanism therefor including a brake and brake rod; said brake rod including a yielding coupling composed of a pair of relatively movable sections; of a brake cylinder, a piston therein operatively connected with said brake rod, a control valve casing having a lost motion connection with one of said sections, a valve within said casing controlling differential pressures to said cylinder, a lever fulcrumed between its ends on said casing and having lost motion connection with the other relatively movable section, said lever adapted to operate said valve upon movement of said rod, and means for normally retaining lost motion between said sections whereby initial movement of the brake rod moves said lever prior to moving ahe valve casing.

5. The combination with a control mechanism, a member to be controlled, an operator operated part, a power actuated cylinder having a piston therein operated by pressure differences, said piston being operatively connected to said member, a lost motion connection between said operator operated part and said member including a pair of relatively movable sections, a control valve casing supported by one of said sections and connected to said member, a valve in said casing, a valve lever of the first order connected to the other section, and pivotally connected between its ends to said valve casing and connected adjacent its free end to said lost motion connection, and spring means adapted to be tensioned by relative movement of said sections and adapted for normally retaining said valve in release position.

6. The combination with a control mechanism, a sectional brake rod to be controlled, an operator operated part connected to one section of the rod, a power actuator having a pressure operated member therein operated by pressure differences, said piston being operatively connected to the other section of the brake rod, a control valve casing, a valve within said casing controlling differential pressures to said actuator, and a lost motion device forming a continuation of said sectional brake rod for suspending said casing between the sections of the brake rod and including a lever pin for operating the control valve, a valve operating lever connected to said pin, and said device transmitting a direct pull independently of the valve upon the sectional brake rod on operation of the operator operated part to prevent any strain being imposed upon any part of the valve or valve casing.

7. The combination with a control mechanism, an element to be controlled, an operator operated part, a power actuated cylinder having a piston therein operated by pressure differences, said piston being adapted to operate said element, a lost motion device between said operator operated part and said element including a pair of relatively movable members, a control valve casing carried by one member and being movable by the operator operated part, a reciprocable valve in said casing, a valve operating lever of the first order fulcrumed between its ends on said valve casing and connected directly to said valve, and adapted to be moved by relative movement of said members, and means for normally maintaining an amount of lost motion between said members and retaining said valve lever in release position.

8. The combination with a control mechanism, a member to be controlled, an operator operated part, a power actuated cylinder having a piston therein operated by pressure differences, said piston being adapted to operate said member, a lost motion device connected between said operator operated part and said member including a pair of mutually supported inter-engaging sections supporting each other, a valve casing supported by said lost motion device, a valve in said casing, and a valve operating lever of the first order having its power arm connected to the lost motion device and its force delivering arm acting directly on said valve and operated by relative movement of the sections thereof.

9. The combination with a control mechanism, a member to be controlled, an operator operated part, a power actuator casing having a movable element connected to said member, a lost motion connection between said operator operated part and said member including a pair of links arranged in longitudinal alignment and mutually supported by a pair of spaced pins each of which is movable longitudinally with its respective link in a slot of the other link, a control valve casing supported from one of said pins, a valve in said casing, and a lever for operating the valve fulcrumed between its ends on the casing and connected at one end with said second pin for assisting in the support of said casing.

10. The combination with a control mechanism comprising a member to be controlled, an operator operated part, a power actuator casing having a movable element therein operated by pressure differences, said element being operatively connected to said member, a lost motion connection between said operator operated part in said member including a brake rod, said rod being composed of a pair of slotted forked sections, the fork of one straddling the fork of the other, one of said sections being connected with said member and the other section being connected with said operator operated part, a control valve casing including an extension extending through the forks and having a pin operating in the slot of the section connected with said operator operated part, a valve lever connected to said section, connected with the operator operated part, a pin carried by said section and operating in a slot in the section connected with said member, said valve lever being pivotally connected to the valve casing for operating a valve therein for controlling said pressure differences, means for normally retaining the valve in brake release position, and said second pin adapted to bottom in said second slot to effect a direct mechanical connection between said operator operated part and said member when the valve has been fully opened.

11. The combination with a control mechanism, a brake element to be controlled by power or manually, a power actuator having a movable member dependent upon differential pressures connected to said element, a foot pedal, linkage between the pedal and element including a lost motion device, a valve casing supported by the linkage, a valve actuator supported by said linkage and having independent movement relative to said linkage and valve limited by the lost motion device causing the valve casing to be moved substantially in unison with the valve actuator after a predetermined movement of the pedal.

12. The combination with a control mechanism, a brake element to be controlled by power or manually, a power actuator having a movable member dependent upon differential pressures connected to said element, a foot pedal, linkage between the pedal and element including a pair of relatively movable links mounted side by side and in longitudinal line, means inter-connecting the links and permitting their relative movement to limited extents in two directions, a valve casing fixed to one of said links, a valve actuator operated by and movable with the other link and independently of the first link to a limited degree, and said lost motion device acting to move the valve casing with said other link and valve actuator when said other link has been independently moved beyond said limited degree.

13. The combination with a control mechanism, a member to be controlled, an operator operated part, a power actuated cylinder having a piston therein operated by pressure differences, said piston being adapted to operate said member, a lost motion device between said operator operated part and said member including a valve operating pin and a pair of mutually supported sections supporting each other in part by said pin, a valve casing supported by said lost motion device, a valve in said casing, and a valve operating lever having its power arm connected to said pin and operated by relative movement of the sections of the lost motion device.

14. A brake operating mechanism comprising a brake, a foot pedal, a member to be controlled for operating the brake, a power actuator having a movable element connected to said member, a rod connecting said pedal with said member, said rod being composed of two relatively movable sections axially aligned and connected by a lot motion device whereby they move in unison after predetermined relative movement, a control valve casing partially supported by one section, a valve in said casing, a valve actuating lever pivotally connected to the other section and to said valve for operating the valve upon relative movement of the two sections, and means for normally retaining said sections in position to move relatively upon initial movement of the foot pedal and thereafter to move in unison after predetermined relative movement of the sections.

15. The combination with a control mechanism, an element to be controlled by power or manually, a power actuator having a movable member dependent upon differential pressures for operation, a pedal, a lost motion device forming linkage between the pedal and said element, a control valve casing supported by at least part of the lost motion device and having a valve operated upon operation of the pedal, and a lever pivotally connected to part of the lost motion device and with the valve and pedal.

16. The combination with an automotive vehicle and a brake mechanism therefor including a brake, a sectional brake rod, of a brake cylinder, a piston therein operatively connected with said brake rod, a control valve casing supported by one section of the rod and having a lost motion connection with the other section of said rod, a valve controlling differential pressures to said cylinder, a lever for operating the valve connected to said other section of the rod, said lever adapted to operate said valve mechanism upon relative movement of said rod sections, and means for normally retaining said lever in inactive position.

17. The combination with a control mechanism, an element to be controlled, an operator operated part, a power actuated cylinder having a piston therein operated by pressure differences, said piston being adapted to operate said element, a lost motion device having connection between said operator operated part and said element including a pair of relatively movable members, a control valve casing supported by one member and being movable by the operator operated part, a valve operating lever supported by the casing and connected to a member of the lost motion connection and adapted to be moved by the relative movement of said members, and means co-operating with said valve operating lever and the casing for normally retaining said valve lever in release position, said lost motion device and connection forming a continuous connection from said element to said operator operated part.

18. The combination with a control mechanism, a member to be controlled, an operator operated part, a power actuated cylinder having a piston therein operated by pressure differences, said piston being adapted to operate said member, a lost motion device between said operator operated part and said member including a pair of mutually supported sections supporting each other and forming a continuous rod connection with the operator operated part and the member to be controlled, a valve casing supported by said lost motion device, a valve in said casing, and a valve operating lever having its power arm connected to the lost motion device and operated by relative movement of the sections thereof.

19. The combination with a control mechanism, an element to be controlled by power or manually, a power actuator having a movable member dependent upon differential pressures for operation, a pivoted foot pedal, a lost motion device forming a connection between the pedal and said element, a control valve casing movable with a part of the lost motion device and said member, a reaction part, a valve for said casing, valve actuator means connecting said valve and reaction part, and said lost motion device acting upon manual application of the brakes to prevent imposition of stress upon said valve.

NIELS A. CHRISTENSEN.